United States Patent [19]

Wilson

[11] 4,088,877
[45] May 9, 1978

[54] SEQUENCE CHECKING DEVICE

[76] Inventor: William J. Wilson, Rte. 1, Brownsboro, Ala. 35741

[21] Appl. No.: 730,964

[22] Filed: Oct. 8, 1976

[51] Int. Cl.² ............................................. G06K 5/00
[52] U.S. Cl. .................................... 235/419; 364/740
[58] Field of Search .................... 235/61.7 R, 61.7 B, 235/61.6 R, 153 R, 153 BK; 209/110

[56] References Cited

U.S. PATENT DOCUMENTS 3,090,945  5/1963  Brandenburg ................... 235/61.7 R
3,102,191  8/1963  Chiapuzio, Jr. et al. ....... 235/61.7 R
3,201,758  8/1965  Pouliart et al. ................. 235/61.7 R Primary Examiner—Daryl W. Cook
Attorney, Agent, or Firm—C. A. Phillips

[57] ABSTRACT

A device for determining the presence and position or order of items which bear a bar coded tag and in which, by means of comparing the codes of two sequentially scanned items, missing, duplicate, or out-of-sequence items are determined. Additionally, all items are counted.

7 Claims, 1 Drawing Figure

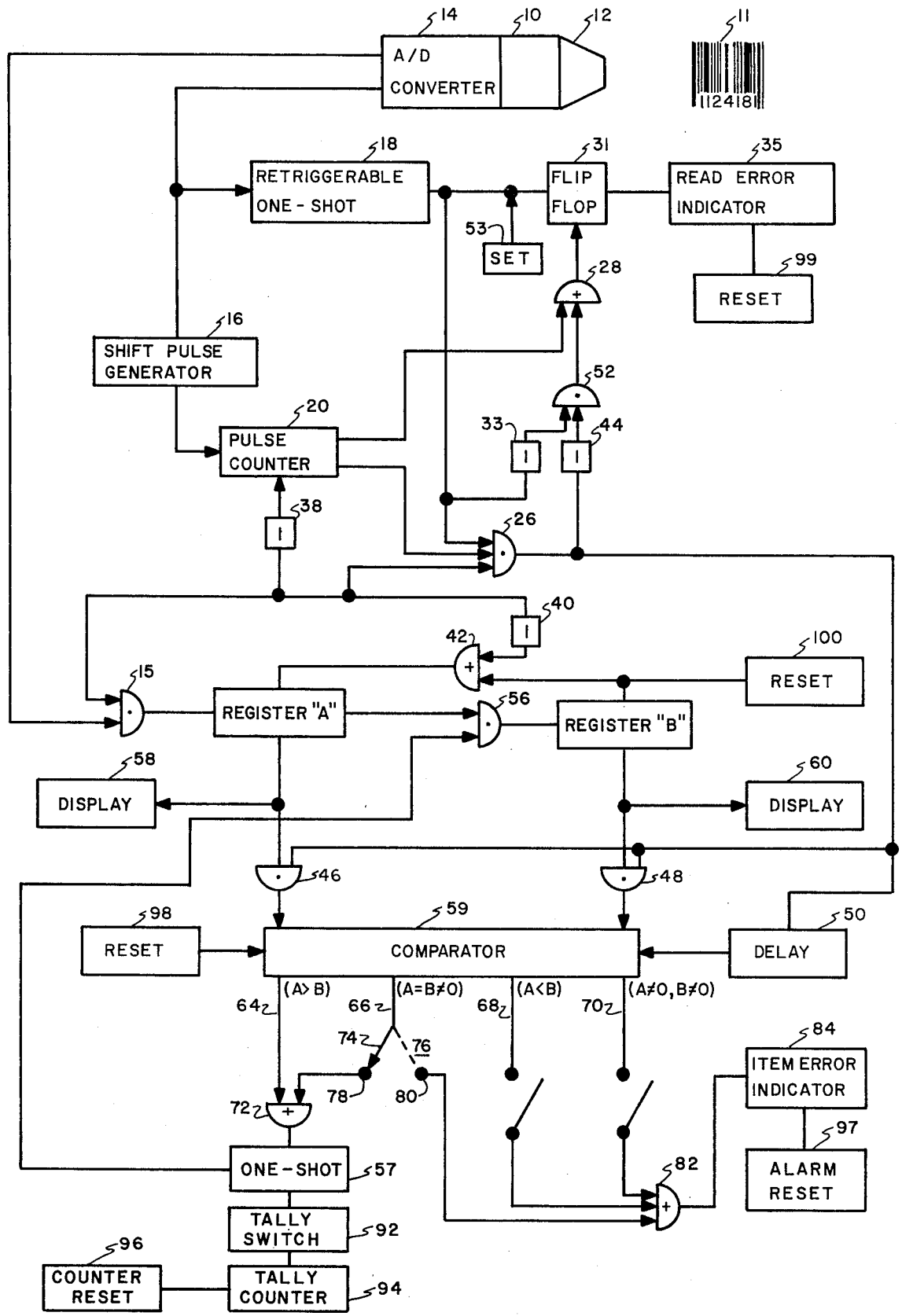

SEQUENCE CHECKING DEVICE

BACKGROUND OF THE INVENTION

1. Field of the Invention

This invention relates to systems for inventory control, materials handling control, process control and the like, and particularly to a system which includes means for identifying missing, duplicate, or out-of-sequence events and items, and for counting such items.

2. General Description of the Prior Art

There are many instances where there is a need for a device, not now known to exist, which will count items in a set, will determine that a required physical sequence exists, and will identify duplicate items or items missing from a set. Examples include books on shelves in a library, phonograph records in a display or selection rack, warehouse items in a priority or date-time queue, items arriving in an assembly line checkpoint, etc.

Accordingly, it is an object of this invention to provide such a device which will perform these functions.

SUMMARY OF THE INVENTION

In accordance with this invention, the items in a set to be inventoried or checked would be sequentially bar coded in the same manner as popularly used today on merchandise sold in supermarkets and other stores. Typically, the code would be a 20-bit code to cover items coded from 00001 to 99999. A standard type hand-held wand reader would be employed to read the bar codes, and it would provide digital outputs to a logic system constructed in accordance with this invention. This logic system comprises a system of registers which holds the last two numbers read by the wand reader and a comparator which compares these numbers and provides an error output in the event that the comparison does not comply with a preset anticipated comparison. In this way, one is able to determine whether a required physical sequence is preserved and to identify duplicate items or items missing from the sequence, and to count all items scanned.

BRIEF DESCRIPTION OF THE DRAWING

The single drawing is an electrical schematic diagram of an embodiment of this invention.

DETAILED DESCRIPTION OF THE DRAWING

Referring to the drawing, there is shown a conventional bar coded tag wand reader 10 which provides coded output pulses responsive to being passed over a conventional bar code printed on an object or a tag 11 attachable to an object. As an example, each bar code would be encoded to cover five binary coded decimal related digits conventionally utilizing 20 binary bits. Thus, wand reader 10 would provide as an output, as it is passed in a proper manner over a bar code, a series of 20 electrical signals representative of ones and zeroes. Additionally, reader 10 provides a sync output coincident with each binary bit. Conventionally, wand reader 10 would include photoelectric sensing means which, through end 12, would scan the bar code. As illustrated, the bar code has a series of spaced bars of different width spacings, and these are sensed and converted by an A-D converter 14 (internal or external to the wand reader) to the binary form described. A-D converter 14 conventionally provides these sync pulses.

The data output of A-D converter 14 is applied to one input of AND gate 15, and the sync output is applied to the input of shift pulse generator 16 and to the input of retriggerable one-shot 18. Retriggerable one-shot 18 is adapted to normally provide a low or "0" (false) output, and upon being triggered to provide a high or set state (true) output, which continues so long as sync pulses are continuously received at a selected and chosen rate. Thus, in the case of the correct operation of wand reader 10, retriggerable one-shot 18 would provide a set or "1" output upon the occurrence of the first sync pulse and hold this output until the twentieth pulse, after which there appearing no other pulse, retriggerable one-shot 18 would return to its low or "0" state.

Shift pulse generator 16, responsive to each sync pulse, provides appropriate amplitude and width pulses to operate pulse counter 20 and to provide a shift control pulse to shift register A.

Retriggerable one-shot 18, pulse counter 20, and other elements to be described function to insure that only accurate readings are supplied to register A. This is necessary since an error may occur if the wand reader is not moved laterally across the bar code or is moved at a speed beyond the operating speed of the reader. Pulse counter 20 contains appropriate decoding logic to provide as an output either a "1" response on lead 22 on the occurrence of 20 continuous pulses, or a "1" output on lead 24 upon the occurrence of 21 continuous pulses. Lead 22 connects to one input of AND gate 26, and lead 24 connects to an input of OR gate 28. The output of retriggerable one-shot 18 is applied to the set input of flip flop 31 and is applied to an input of inverter 33 and as an input of AND gate 26. The output of OR gate 28 is connected to the set input of flip flop 31, and the output of flip flop 31 is connected to read error indicator 35, to an input of AND gate 26, to an input of AND gate 15, through inverter 38 to the reset input of pulse counter 20, and through inverter 40 to an input of AND gate 42.

The output of AND gate 26 is applied through inverter 44 to an input of AND gates 46 and 48 and to delay 50. The output of delay 50 is connected to the operating input of comparator 59.

Outputs of inverters 33 and 44 are connected as inputs to AND gate 52, and the output of AND gate 52 is connected as an input to OR gate 28. The output of OR gate 28 is supplied to the reset input of flip flop 31. Additionally, manual set control 53 connects to the set input of flip flop 31 to provide, when desired, a "high" state for flip flop 31.

Registers A and B are identical, and responsive to 20 bits, register five decimal digits. Data is shiftable from register A to register B by means of AND gate 56 under the control of one-shot 57. Displays 58 and 60 are conventional, being connected, respectively, to the outputs of registers A and B and providing a visible display of the count in these respective registers.

Comparator 59 receives outputs from register A and register B and provides discrete outputs as follows:

An output on lead 64 when the number in register A is greater than the number in register B;

An output on lead 66 when the number in register A is equal to the number in register B and is not a zero;

An output on lead 68 when the output in register A is less than the number in register B; and An output on lead 70 when the number in register A is not greater than the number in register B by one, and A and B are not zeroes.

Lead 64 is connected to one input of OR gate 72, and lead 66 is connected to movable contact 74 of double throw, single pole switch 76. Fixed contact 78 connects to an input of OR gate 72, and fixed contact 80 of switch 76 is connected to an input of OR gate 82. Leads 68 and 70 are connected through switches 86 and 88 to other discrete inputs of OR gate 82. The output of OR gate 82 is connected to alarm 84, and thus depending upon the positions of switches 76, 86, and 88, alarm 84 will be sounded in the event that a selected output of comparator 59 appears and is connected through OR gate 82 to alarm 84. Thus, if identical numbered items are not supposed to appear (and switch 76 is positioned to connect the output of lead 66 to OR gate 82), an alarm will occur when duplicate numbers are successively read by reader 10. Additionally, an alarm will be sounded whenever an out-of-sequence number appears (the later appearing number in register A is smaller than the earlier appearing number in register B) or a non-monotonic number appears, that is, where a number in register A is not greater than the number in register B by one. Whenever a permitted state occurs, that is, where the number in register A is greater than the number in register B, or duplicates are permitted and the number in register A is equal to the number in register B as determined by the connection of lead 66 through switch 76 to an input of OR gate 72, OR gate 72 would be operated, operating one-shot 57, which in turn would provide a gating pulse to AND gate 56 to transfer the contents of register A to register B, and to provide an input through talley switch 92 to talley counter 94, indicating that an item has been properly surveyed. Thus, it will be registered on talley counter 94. Counter reset 96 is adapted to reset talley counter 94 as desired at the end of a counting sequence.

Two reading type errors are detected by the described circuitry, one in cases where the wand reader produces less than 20 successive outputs, and the other where it produces more than 20 successive outputs. In the case of the latter, lead 24 of pulse counter 20 provides an output to OR gate 28 which causes flip flop 31 to change from a set to a reset state and thus provides a "0" output to operate read error indicator 35, and through inverter 40 and OR gate 42 reset register A and pulse counter 20. Further data flow is also blocked by an input to AND gate 15. Error indicator 35, once turned on, remains on until reset (turned off) by reset 99. In the event that the wand reader is moved in such a manner so as to produce less than the required 20 pulses from the reading of a tag, read error would be detected in the following manner.

Upon reading a series of pulses less than 20, retriggerable one-shot 18 would be reset and provide a "0" output. A "0" or false output from AND gate 26 would then be inverted by inverter 33 and applied as a true input to AND gate 52, together with the inverted input (to a "1") of retriggerable one-shot 18 to thus make the output of AND gate 52 true, which applies an input to OR gate 28, and it in turn provides a reset input to flip flop 36, resetting it, and providing a reset output to read error indicator 38, turning it on, and providing reset pulses to register A and pulse counter 20 as previously described. Registers A and B may also be reset by reset 100 through OR gate 42.

OPERATION

To consider one example of the usage of the system, we will assume that it is desired to determine whether books in a library are correctly positioned on the shelf in sequence. Recognizing that there would be duplicates of certain books, duplicate switch 76 is positioned to connect lead 66 to OR gate 72. It will be further assumed that books are physically positioned in a numerical sequence and that each different book in the sequence increases in number by one.

Wand reader 10 is then passed over the bar code of the first book; and assuming that the reader is properly moved over the tag and 20 outputs are provided, flip flop 31 would be positioned to assume a set state wherein it would remain, and AND gate 15 would be enabled to permit register A to be loaded from wand reader 10. Thus, there would now appear in register A a number "1" and a "0" in register B, and these numbers would be appropriately displayed by displays 58 and 60, respectively. Likewise, these numbers would be applied to comparator 59, and after a delay for data transfer and computation, comparator 59 would operate. Since the applied number in register A is greater than the number in register B by 1, one-shot 57 would provide a gating input to AND gate 56 and a count input through talley switch 92 (in the closed mode) to talley counter 94. Thus, the number "1" in register A would be gated through to register B, and a "1" book count would appear in talley counter 94. Upon the sequence being repeated for the next book in a series bearing the numeral "2", the same events would occur. Likewise, if on the third book read the bar code provided the number "2" and with switch 76 in the indicated position, permitting duplicates, a third digit, number "2", would be transferred from register A to register B and a "3" count registered in talley counter 94.

Assume next that a book bearing numeral "8" is read, that is, there has now occurred a sequence of 1, 2, 2, and 8, which indicates a missing item. Similarly, if a "3" is read after an "8," there would also occur a sequence error indication as would be the case if the sequence occurring were 1, 2, 5, and 3, an out-of-sequence indication occurring when the "3" is read. In any such case, the error would be indicated by an output on lead 70, and with switch 88 closed to detect such a condition, OR gate 82 would be operated and thereby alarm 84 directing the attention of the operator to the existence of an error; and then by actually looking at the book, the operator would determine where it should be in sequence. Since it did not conform with the logical inputs of OR gate 72, one-shot 57 would not be automatically operated. To remove the alarm, alarm reset 97 would be operated to turn off alarm 84.

Assume next that wand reader 10 has passed over the bar code of the next book on the shelf to be checked and the numeral "3" is properly read and set into register A. When this occurs, this numeral will be compared with the "2" in register B, and as this "3" is greater than "2", OR gate 72 will be operated, triggering one-shot 57 and thereby AND gate 56 to simply transfer the "3" digit from register A to register B. At the same time, one-shot 57 would apply an input through talley switch 92 to talley counter 94 to indicate an additional book in a correct position. Thus, at this point, a count of "4" will be on talley counter 94.

In the event that switch 76 had last been operated to the dotted line position, indicating that duplicate numerals on succeeding books was not proper, then on the occurrence of this event, there would be no transfer of the digits from register A to register B, and alarm 84 would be operated. Likewise, talley counter 94 would not have indicated a count designating a book in proper order. In the event that a reading occurs of a number placed in register A which is less than a number registered in register B, lead 68 will be energized, and with switch 86 closed, OR gate 82 will be operated to cause alarm 84 to sound. When this occurs, the operator can remove the out-of-sequence book and replace it where it should be in the sequence being inventoried. Although a single item error indicator 84 is used, specific error indicators may be employed for each of outputs 66, 68, and 70 of comparator 59.

By means of the present invention, rapid examination of items arranged in a selected sequence can be checked, and usually, with little effort, an out-of-sequence item can be returned to its proper sequence.

Having thus disclosed my invention, what is claimed is:

1. A sequence checking device comprising:
   bar code reading means for providing as an electrical output a selected number and a series of signals representative of a bar encoded number;
   first and second digital registers, and gate means interconnecting said registers;
   comparator means responsive to a digit appearing in said registers and providing:
   a first output whenever the digit in said first register is smaller than the output in said second register,
   a second output whenever the digit in said first register is not greater than the digit in said second register by a selected value, and
   a third output whenever the digit in said first register is greater than the output in said second register by a selected value;
   alarm means responsive to the presence of one of said outputs for indicating an error state; and
   means responsive to said third output for providing a gating pulse to said gate means, whereby after a successful comparison between said registers wherein the digit in said first register exceeds the digit in said second register by said selected amount, said gate means is enabled, gating the then digit in said first register to said second register preparatory to the taking of a next reading.

2. A sequence checking device as set forth in claim 1 wherein said comparator means further provides an output, a fourth output, whenever a digit in said first register is equal to the digit in said second register, and switching means for providing this output to said alarm means, whereby, selectively, upon the occurrence of equal value digits in said registers, said alarm is operated.

3. A sequence checking device as set forth in claim 2 wherein said selected value is 1.

4. A sequence checking device as set forth in claim 2 wherein said switching means includes means for disconnecting said fourth output from said alarm means and coupling said fourth output to said gate means, whereby said gate means would be enabled, transferring a compared digit in said first register to said second register upon the appearance of digits in these registers which are equal.

5. A sequence checking device as set forth in claim 4 further comprising means responsive to said third output and selectively responsive to said fourth output for counting the instances when a successful reading has been achieved, whereafter the digit in said first register is transferred to said second register.

6. A sequence checking device as set forth in claim 5 further comprising means interconnecting said reading means with said first register for cancelling any digital input to said first register whenever less than or more than a selected number of signals is supplied by said reading means.

7. A sequence checking device as set forth in claim 5 further comprising a first display means connected to and displaying the output of said first register, and second display means connected to and displaying the output of said second register.

* * * * *